(12) United States Patent
Gargi (10) Patent No.: US 9,734,503 B1
(45) Date of Patent: Aug. 15, 2017

(54) HOSTED PRODUCT RECOMMENDATIONS

(75) Inventor: Ullas Gargi, Los Altos, CA (US)

(73) Assignee: GOOGLE INC., Mountain View, CA (US)

( * ) Notice: Subject to any disclaimer, the term of this patent is extended or adjusted under 35 U.S.C. 154(b) by 1398 days.

(21) Appl. No.: 13/165,761

(22) Filed: Jun. 21, 2011

(51) Int. Cl.
G06Q 30/00 (2012.01)

(52) U.S. Cl.
CPC .................................. G06Q 30/00 (2013.01)

(58) Field of Classification Search
USPC ..................................... 705/14.54, 26.1–27.2
See application file for complete search history.

(56) References Cited

U.S. PATENT DOCUMENTS

| | | | |
|---|---|---|---|
| 6,128,600 | A | 10/2000 | Imamura et al. |
| 6,223,094 | B1 | 4/2001 | Muehleck et al. |
| 6,631,356 | B1 | 10/2003 | Van Horn et al. |
| 6,847,972 | B1 | 1/2005 | Vernau et al. |
| 7,107,230 | B1 | 9/2006 | Halbert et al. |
| 7,895,080 | B2 | 2/2011 | Haynes et al. |
| 8,285,589 | B2 * | 10/2012 | Snodgrass et al. ........ 705/14.23 |
| 8,381,120 | B2 | 2/2013 | Stibel et al. |
| 2002/0154114 | A1 | 10/2002 | Christensen et al. |
| 2002/0156694 | A1 | 10/2002 | Christensen et al. |
| 2004/0117271 | A1 | 6/2004 | Knight et al. |
| 2004/0143600 | A1 | 7/2004 | Musgrove et al. |
| 2005/0071251 | A1 * | 3/2005 | Linden et al. .................. 705/26 |
| 2005/0268255 | A1 | 12/2005 | Hrastnik et al. |
| 2005/0289158 | A1 | 12/2005 | Weiss et al. |
| 2006/0059135 | A1 | 3/2006 | Palmon et al. |
| 2006/0218052 | A1 | 9/2006 | Haynes et al. |

(Continued)

FOREIGN PATENT DOCUMENTS

| | | |
|---|---|---|
| JP | 2009-026195 A | 2/2009 |
| KR | 10-2009-0002145 A | 1/2009 |
| KR | 10-2009-0076575 A | 7/2009 |
| WO | WO 2006/065546 A2 | 6/2006 |
| WO | WO 2011/019749 A2 | 2/2011 |

OTHER PUBLICATIONS

Internet Article: eBay: Turbo Lister FAQ—Seller Tools retrieved from http://pages.ebay.com/turbolister, http://pages.ebay.com/turbolister2/faq.html, pp. 1-4, Nov. 30, 2010.

(Continued)

*Primary Examiner* — Ethan D Civan
(74) *Attorney, Agent, or Firm* — Johnson, Marcou & Isaacs, LLC (57) ABSTRACT

This disclosure relates to allowing retailers of all sizes to log information regarding shoppers and to provide shoppers with product recommendations. The product recommendations may be responsive to logged shopper information, such as shoppers' current or previous browsing habits, for example. The product recommendations also may be responsive to other sources of information, such as search trends on search engines and/or information provided in blogs, social network websites, and/or other websites. A service provider, which is not a retailer, may provide the product recommendations for the retailer, either directly or by providing a script for embedding within the retailer's website. For example, the retail website may include a logging script and/or a product recommendation script, which communicate with one or more backend computing devices to provide the product recommendations.

21 Claims, 3 Drawing Sheets

(56) References Cited

U.S. PATENT DOCUMENTS

| | | | |
|---|---|---|---|
| 2006/0289637 | A1 | 12/2006 | Brice et al. |
| 2007/0250705 | A1 | 10/2007 | Smith et al. |
| 2009/0063247 | A1 | 3/2009 | Burgess et al. |
| 2009/0157472 | A1 | 6/2009 | Burazin et al. |
| 2009/0187583 | A1 | 7/2009 | Pape et al. |
| 2009/0198596 | A1 | 8/2009 | Dolan et al. |
| 2010/0114704 | A1* | 5/2010 | Steelberg et al. .......... 705/14.54 |
| 2011/0191211 | A1 | 8/2011 | Lin |
| 2012/0150598 | A1 | 6/2012 | Griggs |
| 2012/0221563 | A1 | 8/2012 | De et al. |

OTHER PUBLICATIONS

Internet Article: eBay: Turbo Lister—Seller Tools—List Multiple Items and Upload to eBay in Bulk!, http://pages.ebay.com/turbo_lister, pp. 1-2, Nov. 30, 2010.

U.S. Appl. No. 12/950,655, filed Nov. 19, 2010, pp. 1-45, Nov. 19, 2010.

U.S. Appl. No. 13/226,333, filed Sep. 6, 2011, pp. 1-34, Sep. 6, 2011.

eBay—Turbo Lister Listing Activity Quick Start Guide, eBay File Exchange Catalog Listing Template, vols. Ver. 1.1, pp. 1-8, Apr. 1, 2007.

Garg, Y. C., Office Action issued in copending U.S. Appl. No. 13/226,333, filed Sep. 6, 2011, pp. 1-13, May 23, 2013.

Iwarere, O., Office Action cited in copending U.S. Appl. No. 12/950,655, filed Nov. 19, 2010, pp. 1-16, Aug. 5, 2013.

Liu et al., Clustering Billions of Images with Large Scale Nearest Neighbor Search, IEEE Workshop on Applications of Computer Vision (WACV'07), pp. 1-6, Jan. 1, 2007.

Oh, E. G, International Search Report and Written Opinion filed in International Application No. PCT/US2012/054027, pp. 1-11, Feb. 27, 2013.

Garg, Y., Office Action issued in copending U.S. Appl. No: 13/226,333, filed Sep. 6, 2011, pp. 1-14, Oct. 4, 2013.

* cited by examiner

HOSTED PRODUCT RECOMMENDATIONS

TECHNICAL FIELD

The present disclosure relates generally to e-commerce and, specifically, to a system and method for providing hosted product recommendations.

BACKGROUND

Large e-commerce and retail websites may incorporate complex software coding methods to log shopper information. Such shopper information may include, for example, information regarding the approximate physical location of the shopper, an amount of time spent by the shopper on each e-commerce web page, and entry and exit web pages for the shopper, linked from one product web page to another. For example, the physical location of the shopper may be collected via the Internet Protocol (IP) address of the shopper's computer. Analysis of this shopper information is useful for improving the marketing potential of a retail website to consumers.

A single web page within a retail website may include information regarding one of a group of products and/or services. The retailer may use feedback analysis from web page visitor logging information for the single web page to determine popularity of the product and/or service corresponding to the web page. This analysis enables the retailer to adjust product availability, display areas, and special offers, to improve sales performance of each individual product. For simplicity in this disclosure, the term "product" is used herein to refer to either a product or a service or combination thereof. The term "retailer" is used herein to refer to a person or entity who offers products for sale via the Internet, including "E-commerce website owners," "online retailers," and "merchants." The term "shopper" is used herein to refer to any visitor of a retailer website, regardless of whether the visitor intends to make a purchase via the retailer website.

An analysis of webpage logging information can determine the shopping patterns, unique interests, and probable behavior of shoppers as a part of their online activities. Further, it is possible to analyze product performance during different times periods, such as during the day, during the evenings, over the course of a period of days, weeks, and/or months, and/or during holiday seasons. Extrapolating the analyzed information provides significant information for defining product placement and marketing requirements in future sales. For example, one shopper may shop for products based on current deals, while another may focus on the best reviewed or most popular products. Also, a shopper might shop for accessories tied to products via related hyperlinked product web pages. For purposes of simplicity in this disclosure, discussion of "product web pages" herein should be deemed to include both web pages that specifically relate to a particular product and web pages related to product accessories.

Large retail websites generally are capable of investing in complex visitor logging and analytics algorithms because the owners have the capability, knowledge, and resources to create and maintain such a system. However, smaller retailers do not generally have sufficient resources to utilize such systems in connection with their retail websites.

SUMMARY

In certain exemplary embodiments, a service provider provides hosted product recommendations for a retailer. A computer of the service provider collects product information regarding products available for sale via the Internet. The computer identifies, for at least a particular one of the products, at least another one of the products, which is related to the particular product. In response to a shopper viewing information regarding the particular product on an electronic information page of the retailer, the computer communicates information regarding each identified product, for display to the shopper via the electronic information page.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF THE EXEMPLARY EMBODIMENTS

Overview

The exemplary methods and systems described herein enable retailers of all sizes to log information regarding shoppers and to provide shoppers with product recommendations. The product recommendations may be responsive to logged shopper information, such as shoppers' current or previous browsing or purchasing habits (including current shopping cart contents), for example. In addition or in the alternative, the product recommendations may be responsive to other sources of information, such as search trends on search engines and/or information provided in blogs, social network websites, and/or other websites.

A hosting company hosts a retail website on a backend computing device. The hosting company may be the retailer or a third party operating on behalf of the retailer. A service provider, which may be the same as or different than the hosting company, can provide product recommendation services via the retailer's website. These services may include, for example, providing real-time or near real-time product recommendations to shoppers visiting the retailer's website. The product recommendation service provider may provide these services using one or more scripts within the retail website. For example, the retail website may include a logging script and/or a product recommendation script, which communicate with one or more backend computing devices of the hosting company, service provider, or another entity, to provide these services.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as the act may be performed by more than one computer. The inventive functionality of the invention will be explained in more detail in the following description, read in conjunction with the figures illustrating the program flow.

System Architecture

Figure 1:
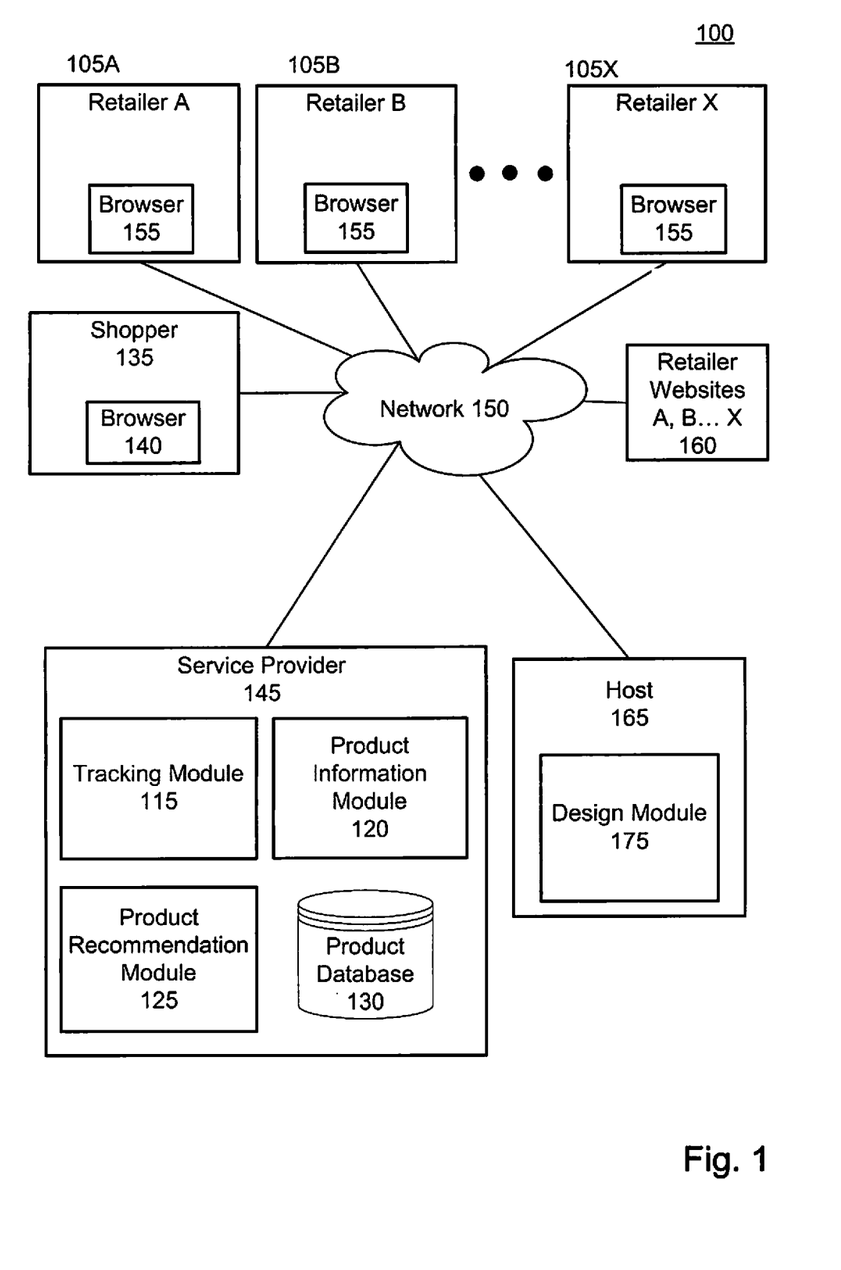
FIG. 1 is a block diagram depicting a system for providing hosted product recommendations, in accordance with certain exemplary embodiments.

Turning now to the drawings, in which like numerals indicate like elements throughout the figures, exemplary embodiments are described in detail. FIG. 1 is a block diagram depicting a system 100 for providing hosted product recommendations, in accordance with certain exemplary embodiments. As depicted in FIG. 1, the system 100 includes network devices 105, 135, 145, and 165 that are configured to communicate with one another via one or more networks 150. Each network 150 includes a wired or wireless telecommunication system or device by which network devices (including devices 105, 135, 145, and 165) can exchange data. For example, each network 150 can include a local area network ("LAN"), a wide area network ("WAN"), an intranet, an Internet, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 105, 135, 145, and 165 includes a device capable of transmitting and receiving data over the network 150. For example, each network device 105, 135, 145, and 165 can include a server, desktop computer, laptop computer, smartphone, handheld computer, personal digital assistant (PDA), or any other wired or wireless, processor-driven device. In the exemplary embodiment depicted in FIG. 1, the network devices 105, 135, 145, and 165 are operated by or on behalf of retailers, shoppers, a product recommendation service provider, and a website host, respectively.

Each retailer network device 105 and shopper network device 135 includes a browser application module (155 or 140, respectively), such as Microsoft Internet Explorer, Firefox, Netscape, Google Chrome, or another suitable application for interacting with web page files maintained by the network devices 105, 135, 145, and 165, and/or other network devices. In certain exemplary embodiments, a shopper may use the browser application module 140 on his shopper network device 135 to view one or more retailer webpages 160, which are hosted by or on behalf of the retailers 105. For example, certain of the retailer webpages 160 may be hosted by retailers 105 or by third party website hosts 165, which are operating on behalf of the retailers 105. Similarly, a retailer may use the browser application module 155 on its network device 105 to communicate product catalogs, product updates, website updates, and/or webpage design changes to its website host 165, as applicable. The web pages 160 can include text, graphic, images, sound, video, and other multimedia or data files that can be transmitted via the network 150. For example, the web pages 160 can include one or more files in the HyperText Markup Language (HTML), eXtensible Mark up Language (XML), or JavaScript Object Notation (JSON).

The retailer web pages 160 include information regarding products and/or services available for purchase from the retailers 105. As further described below, each of the web pages 160 can include an area, which provides product recommendation information. This information may include recommendations or other information regarding products that are related to products for sale on the web page 160, products that may be relevant to an individual shopper based on his/her shopping history (including current shopping cart contents) or habits, and/or products that may be desirable to shoppers generally, based on information from external websites, search engine queries, or other sources, for example. Product recommendation information can help improve marketability of web pages 160 and increase the accessibility of products to consumers.

In certain exemplary embodiments, the service provider 145 can provide the product recommendation information to the retailers 105 and/or hosts 165, as applicable, for inclusion in the web pages 160. In certain alternative exemplary embodiments, the service provider 145 and web site host 165 are the same entity. In such exemplary embodiments, that entity may generate and include in its hosted web pages 160 product recommendation information.

The service provider device 145 includes software modules 115-125, which, in certain exemplary embodiments, can accept raw information and transform the information into scripts, which can be rendered in a browser or a stand-alone application. For example, one or more of the software module 115-125 may generate scripts based on product information, which may be provided (for example, from the retailers 105) in a computer-coded format and/or a raw data format. Accordingly, in certain exemplary embodiments, each generated script may be displayed in a non-renderable version in a browser page, for embedding into other computer-coded web pages. For example, the service provider 145, host 165, or retailer 105 can embed one or more of the scripts in an existing or new retailer website 160, to provide the product recommendation information to shoppers.

In certain exemplary embodiments, the host 165 may include a webpage design software module 175, which end users (such as the retailers 105 or host operators) can use to design and/or modify a webpage 160 to incorporate the scripts and/or other information, such as information from the modules 115-125. For example, the design module 175 can provide design templates with customization options the end user can manipulate to generate a new retail website 160 or to modify an existing retail website 160. In certain exemplary embodiments, the design module 175 can generate a web page design script, which can be passed to the shopper's device 135 to render a designed web page 160 in the browser 140. The web page design script may include pre-determined locations for embedding the scripts and/or information from the modules 115-125, for example. A dynamic HTML page can implement this exemplary embodiment, for example, by using JavaScript or Java inputs for re-arranging displayed information.

The software modules 115-125 include a logging module 115, a product information module 120, and a recommendation module 125, respectively. The logging module 115 logs shopper information and/or generates a script, which may be embedded within the web pages 160 to log shopping information. For example, the logging module 115 may include scripting language, such as Python, PHP Hypertext Preprocessor, JavaScript, and/or JSP (JavaServer Pages) to create logging scripts. The logged shopper information may include, for example, information regarding the approximate physical location of the shopper, an amount of time spent by the shopper on each web page 160, and entry and exit web pages 160 for the shopper, linked from one product web page 160 to another. For example, the physical location of the shopper may be collected via the Internet Protocol (IP) address of the shopper's computer 135. In certain exemplary embodiments, the retailer 105 may use this logged information to provide personalized marketing to the shopper 135 and/or improved marketing on the web page 160 generally.

The product information module 120 collects product information that can be included in web pages 160 and/or referenced when generating and providing product recommendation information. For example, the product information module 120 may collect product information from retailers 105 or others via web entry and/or a direct data feed or directly or indirectly from paper or electronic product catalogs, blogs, social networks, informational web sites, or any other information source, whether product-specific or otherwise. The term "collect" is used herein to refer to active solicitation or collection of information, such as via web-mining, as well as any other type of receipt of information, whether the module 120 is active or passive in such receipt of information. In an exemplary embodiment, the retailer may periodically communicate the retailer's product catalog, and any updates thereto, to the service provider The product information may include any information related to a product, such as a product name, product brand, product price, product picture, product rating, a website address (for example, uniform resource locator ("URL")) for the retailer, and/or a specific web page address for the product within the website. The product information also may include, for each product, information regarding one or more products of the product retailer or a third party, which are related to the product. For example, this "product relationship information" can include information regarding accessories related to a product or other products of the retailer or a third party, which are often bought or desired by purchasers of the product. For example, the retailer 105 may provide the module 120 with product information, which includes relationship tables or other data indicating relationships between products.

The product recommendation module 125 generates product recommendation information based, at least in part, on collected product information and/or shopper information. This may involve, in certain exemplary embodiments, the product recommendation module 125 working concurrently and/or cooperatively with the product information module 120 and/or the logging module 115 to generate product relationship information. Such product relationship information may define the inter-relationship of products, or the reaction of shoppers to certain prices and deals on products (such as chosen products or products related to chosen products) from the retail website 160, for example. This information can be obtained, for example, by analyzing current trends on the website 160 and/or other (external) websites (for example, news articles, blogs, social networks, forums, product logs, etc.), analyzing collected product information, and/or analyzing collected shopper information. For example, a smart learning software program, like neural networks, can be resident in the product recommendation module 125 and operable to extract relationship information between products, shoppers, and other sources, depending on previous and current browsing habits of the shopper. In an exemplary embodiment, the products in the product relationship information can be limited to the products of the retailer, such as products identified in the product information communicated from the retailer to the service provider. In certain exemplary embodiments, the shopper information can be limited to analysis of a particular shopper's information to develop the product relationship information for the particular shopper. Alternatively, or additionally, information for multiple shoppers can be considered when developing the product relationship information for the particular shopper.

The product recommendation module 125 populates the website 160 with the generated product recommendation information and/or generates a script, which may be embedded within the website 160 to provide the generated product recommendation information. For example, the product recommendation module 125 can generate a script, such as a JavaScript code implementation, that reviews the product information from the retailer and generates a dynamic Hyper Text Markup Language (DHTML) format script for rearranging HTML content (including, for example, internal retailer and/or external retailer product information) based on the shopper's choices in real-time, at the shopper's computing device, without further backend server input.

In certain exemplary embodiments, when a shopper visits a retail web page 160 for the first time or is otherwise "unknown" to the retailer 105, the web page 160 may display product recommendations that are generally applicable and not specifically personalized to the shopper. Thereafter, product recommendations may be tailored to the shopper based on shopper information collected by the module 115, a logging script embedded in the web page, cookies in the shopper's device 135, etc. The product recommendations may be displayed in one or more lists, icon groups, pictures, etc. For example, the product recommendations may include identification of one or more recommended products, along with, for each recommended product, a brief description of the product, a link a webpage with additional information regarding the product, a price of the product, a reason why the product is recommended, etc.

System Process

Figure 2:
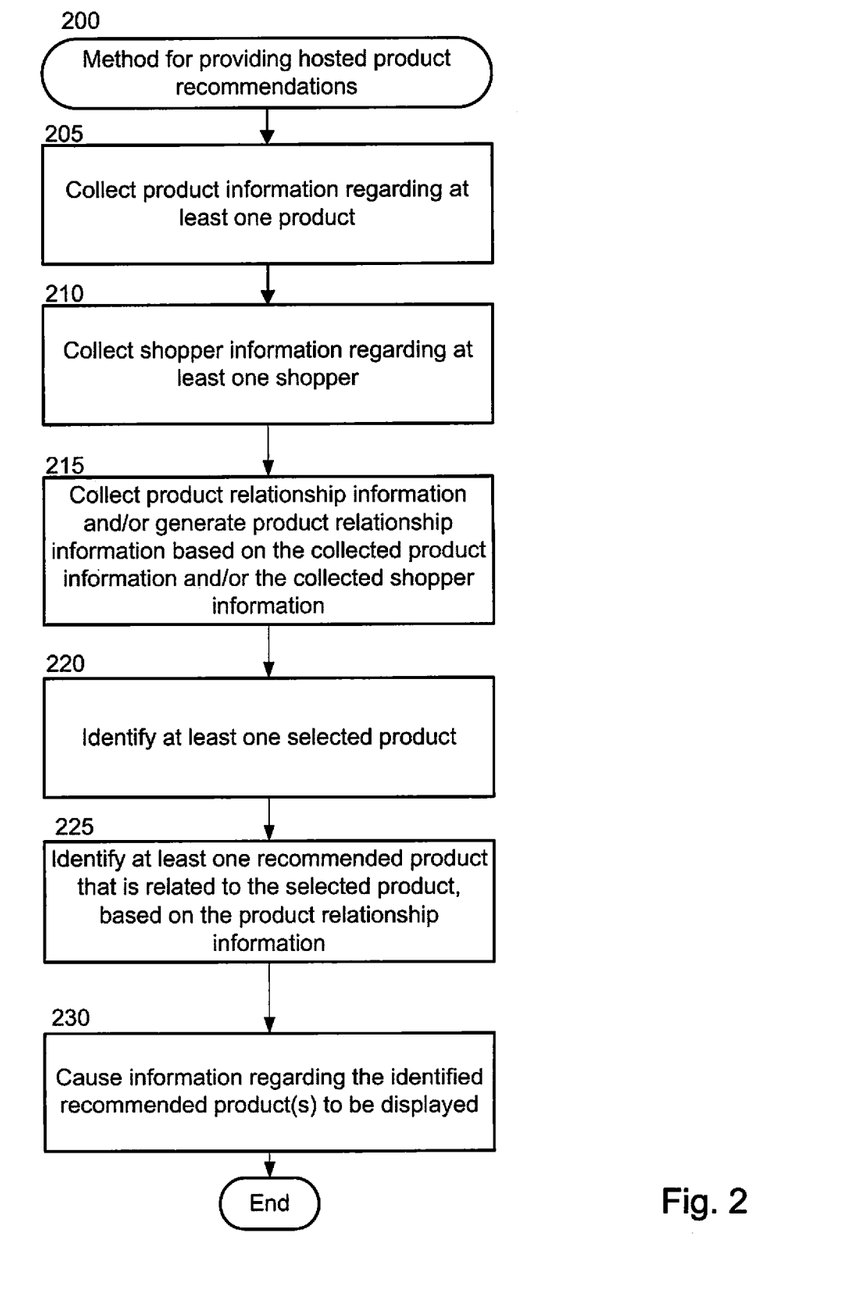
FIG. 2 is a flow chart depicting a method for providing hosted product recommendations, in accordance with certain exemplary embodiments.

FIG. 2 depicts a flowchart of a method 200 for providing hosted product recommendations, in accordance with certain exemplary embodiments. The exemplary method 200 is merely illustrative and, in alternative embodiments of the invention, certain steps can be performed in a different order, performed in parallel with one another, or omitted entirely, and/or certain additional steps can be performed without departing from the scope and spirit of the invention. The method 200 is described with reference to the system components of FIG. 1. In block 205, the product information module 120 collects product information regarding one or more products. For example, the product information module 120 may collect product information from retailers 105 or others via web entry and/or a direct data feed or directly or indirectly from paper or electronic product catalogs, blogs, social networks, informational web sites, or any other information source, whether product-specific or otherwise. The product information may include any information related to a product, such as a product name, product brand, product price, product picture, product rating, a website address (for example, URL) for the retailer, and/or a specific web page address for the product within the website. In an exemplary embodiment, a retailer may communicate periodically its product catalog, or updates thereto, to the service provider.

In block 210, shopper information is collected. The shopper information may include, for example, demographic information regarding the shopper and historical information regarding the shopper's past web browsing and shopping experiences, such as amounts of time spent by the shopper on each web page 160, entry and exit web pages for the shopper, information regarding an approximate physical location of the shopper, etc. The logging module 115 may collect this information from cookies in the shopper's device 135 and/or via a script embedded within the web site 160, for example. In certain exemplary embodiments, the script is embedded within the web site 160 (for example, by the logging module 160) and provides the shopper information in block 210. A person of ordinary skill in the art having the benefit of the present disclosure will recognize that, although blocks 205 and 210 are depicted in FIG. 2 as discrete steps that occur sequentially, collection of product and shopper information may occur periodically or continuously throughout the method 200.

In block 215, product relationship information is collected and/or generated. The product relationship information may include, for example, information regarding the inter-relationship of products about which information was collected in block 205, or the reaction of shoppers to certain prices and deals on products. In certain exemplary embodiments, the product information module 120 can extract at least a portion of the product relationship information from the product information collected in block 205. For example, the information collected in block 205 may include one or more relationship tables or other data indicating relationships between products. In addition or in the alternative, the product information module 120 and/or the product recommendation module 125 can generate the product relationship information based on the collected product information and/or the collected shopper information. For example, the product recommendation module 125 can generate the product relationship information by analyzing current trends on retail websites 160 and/or other (external) websites (for example, news articles, blogs, social networks, forums, product logs, etc.). In an exemplary embodiment, the shopper information may be obtained from shoppers of the particular retailer (and its corresponding website) for which the product relationship information is to be provided, for example, by referencing only shopper information obtained from the particular retailer's website. In certain exemplary embodiments, the shopper information may be obtained from shoppers of multiple retailers (and their corresponding websites) to create an aggregated set of shopper information that is used to provide the product relationship information for the particular retailer, for example, by referencing shopper information from multiple websites, which may or may not include the particular retailer's website.

In block 220, a selected one of the products is identified. For example, the product recommendation module 125 may identify a selected product in response to a shopper clicking on a hyperlink for information regarding a product, a shopper viewing a webpage 160 that relates to the product, and/or the product recommendation module 125 receiving or reading information regarding the product (whether in conjunction with an action by the shopper or otherwise). In block 225, the product recommendation module 125 identifies at least one recommended product that is related to the selected product, based on the product relationship information collected and/or generated in block 215. For example, the recommended products may include one or more accessories related to the selected product or other products of the retailer of the selected product or a third party, which are often bought or desired by purchasers of the selected product. The recommended products also may include products that are recommended based on the collected shopper information, with or without regard to whether the recommended products are related to the selected products. For example, the recommended products may include products that the shopper previously has reviewed on a webpage or about which the shopper has otherwise expressed interest. In certain exemplary embodiments, the recommended products can be limited to the products of the particular retailer at which the shopper is shopping, for example, by limiting the recommended products to products that are currently available in the retailer's product catalog, in the retailer's current inventory, or on the retailer's website.

In block 230, the product recommendation module 125 causes information regarding the identified, recommended product(s) to be displayed. For example, if block 220 involved a shopper reviewing a webpage 160 with information regarding the selected product, the product recommendation module 125 may cause, in block 230, the recommended product information to be displayed in a portion of the webpage 160. This may involve, for example, sending the recommended product information to the retailer 105 or the host 165 for inclusion in the retail webpage 160, editing the webpage 160 directly by the product recommendation module 125. For example, the product recommendation module 125 may generate a script, which the retailer 105, host 165, and/or service provider 145 can embed within the webpage 160, for displaying the recommended product information in the webpage 160.

In certain exemplary embodiments, the product recommendation module 125 may generate the script without a shopper first selecting a product in block 220. Instead, the product recommendation module 125 may select one or more products in block 220 and, for each selected product, generate one or more scripts for the product in block 230. The product recommendation module 125 can provide the script(s) to the retailer 105 or the host 165 for inclusion in the retail webpage 160 and/or the product recommendation module 125 may itself embed the script(s) within the webpage 160. Once embedded in a webpage, a script can cause product recommendation information to be displayed via the webpage 160, whether directly within the webpage or via a pop-up window or other mechanism for providing web-based content to a user.

Figure 3:
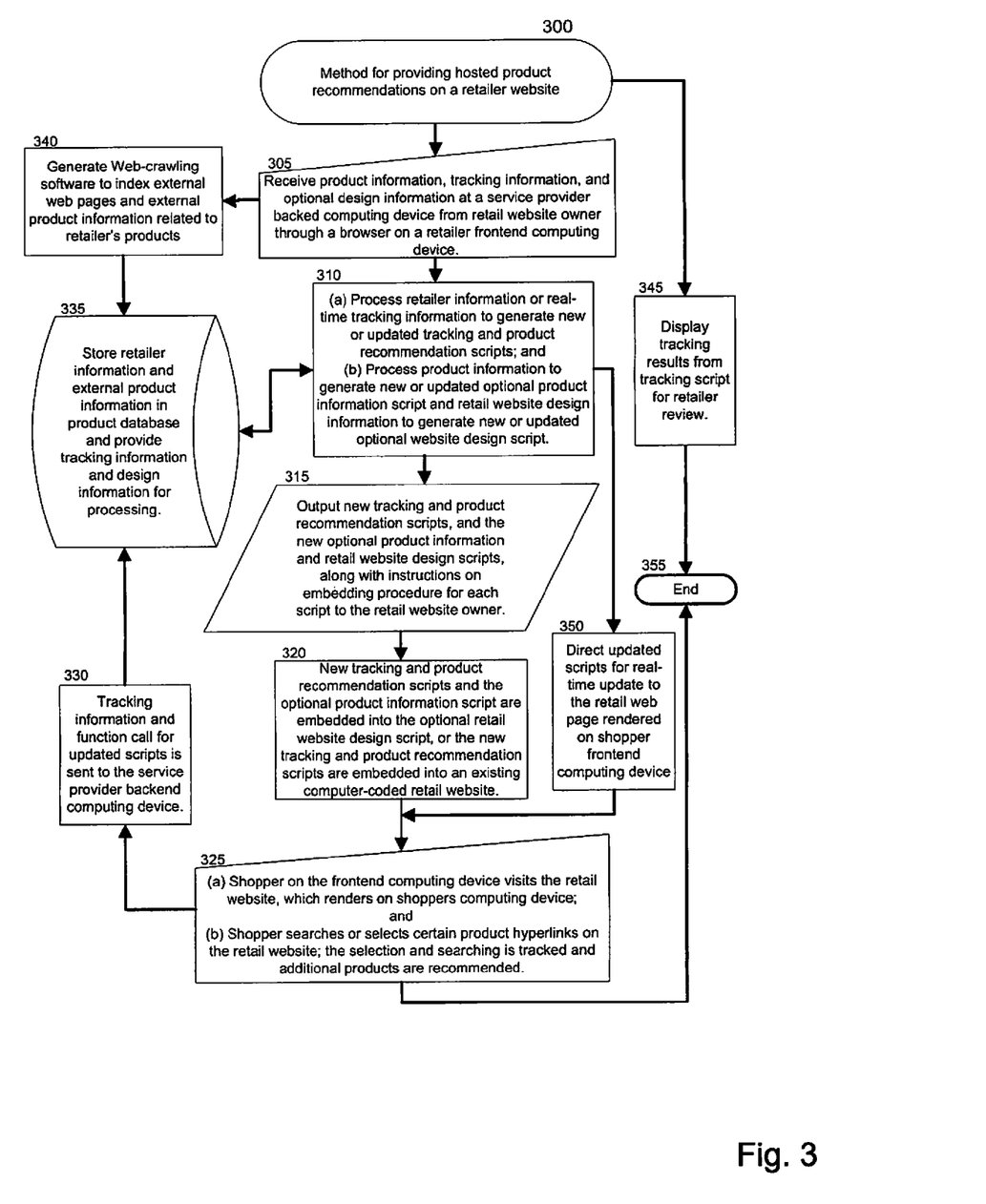
FIG. 3 is a flow chart depicting a method for providing hosted product recommendations, in accordance with certain alternative exemplary embodiments.

FIG. 3 depicts a flowchart of a method 300 for providing hosted product recommendations, in accordance with certain alternative exemplary embodiments. The exemplary method 300 is merely illustrative and, in alternative embodiments of the invention, certain steps can be performed in a different order, performed in parallel with one another, or omitted entirely, and/or certain additional steps can be performed without departing from the scope and spirit of the invention. The method 300 is described with reference to the system components of FIG. 1.

In the exemplary method, a service provider website offers a login process for secure submission of retailer information. The retailer information can include product information, logging information, and optional website design information. The service provider 145 may receive the retailer information in block 305 via a website form submission, an automated e-mail process, or any other process to transfer information via a network 150. This information can be stored, as described in block 335 to a database, such as database 130, from which the information can be accessed by the respective modules 115-125. Prior to or in connection with such storage, the service provider 145 can process the product information to extract any product relationship information, which may be provided by the retailer in block 305 or generated based on the retailer information and/or other information, such as external product information that is collected and/or indexed via web-crawling software, as illustrated in block 340.

In certain exemplary embodiments, if raw product information, such as product catalogs, manual product entries, etc., is provided as an input at block 305, then the raw product information is transformed in block 310 to a product information script including at least a portion of the product information in a web page based format. This format supports rendering of product information in a browser window, thereby making the product information user friendly and presentable. The website design sub-module 175 completes a design template of the retail website as described in block 310, where the design is based on the retailer input for an intended design as disclosed in block 305.

In block 310, the product information module 120 generates a product information script by processing the input product information from the retailer. In block 320, the product information module 120 and/or website template design module 175 ports (or embeds) the product information script into the website design script. Accordingly, the design set forth in the design script displays product information as submitted by the retailer. Exemplary design scripts include cascade style sheet (CSS), or a JavaScript combination with any other web-based styling script.

In another exemplary embodiment, the relationship information generated may include inter-product or product-shopper type relationships. When a web page of the retail website 160 loads in a shopper's browser 140 for the first time, the web page may include an inter-product set of relationships for the recommended products. A measure of current web trends of the products that the retailer sells via the retail website 160 can provide the basis for such relationship information. In the absence of shopper logging information on the first load, presentation of recommended products may include information related to the shopper's interests in other websites owned by the retail website owner. By way of an example, if a retail website owner also owns a website providing blogging services, a forum, or a news related website, then information from these websites, as to the same IP address of the shopper, may be used to provide the shopper with recommended products. A shopper's habits from related websites, by way of a comment on a blog or a forum discussion, for example, may be logged using the logging software 115 which can process the information from the comment to determine product choices. In this exemplary implementation, the knowledge of the shopper's IP address or login information of the shopper as connected to the related website and the retailer's website may be used to automatically arrange product recommendations according to the shopper's blogging and/or forum activity. Such use of login information across related websites belonging to the same retail website owner is based on permissions granted by the shopper for use of logging information across the retailer's websites.

Block 315 depicts the scripts generated at the service provider backend computing device 110 after processing in block 310, where the scripts are placed in a non-renderable manner on a browser-renderable results web page shown in block 315. The new product recommendation script generated after processing in block 310 may be based on a first default placement of recommended products according to an analysis of web-crawled product information as described in block 340 or from the shopper's online habits, as described above. The backend computing device 145 (either combined with the hosting service 165 or otherwise) provides the retailer's frontend computing device 105 with the results web page, including the product recommendation script, the optional product information script, and the product logging script, where the retailer's browser 155 renders it. The retail website's existing computer-coded web pages or the newly designed retail web page template with designated locations incorporates the generated scripts using a copy-and-paste method, as described in block 320. When the existing or new retail website is pushed online to function in real-time and a shopper visits the retail website, the website renders with all the scripts on the shopper's browser 140.

In certain exemplary embodiments, the scripts may be individual files or simple script embedded within the URL code of a product web page link. When a shopper browses the retail website for the first time, the website hosting server 165 transfers the renderable files to the shopper's frontend computing device and renders the files within the browser 140. Alternatively, the scripts can be reference links or "software function calls" embedded into portions of the existing retail website, or the new retail website, where the scripts ping the service provider's backend computing device 145, for product recommendation information, product information, and the logging information. The shopper's computing device 135 receives browser-renderable code, including the product information, recommendation information, and logging information, from the service provider's computing device 145, to render with the retail website, thereby providing the recommended product information into the pre-determined locations of the retail website.

In certain exemplary embodiments, as described in block 330, the logging script logs the shopper's information and habits on the retail website and sends the logged information to the service provider's backend computing device 145. This information is retrieved from the storage area, described in block 335, and sent to the processing block 310, thereby updating the product recommendation script and the logging script according to the shopper's information and habits. Block 350 directly passes the updated script to the shopper's computing device 135 from the service provider's backend computing device 145 for rendering in block 325, at the browser 140 of the shopper's computing device 135. As a result, the shopper notices that when he/she selects an item by clicking on the item or even hovering over the item (using the computer mouse), function calls may cause a section on the website 160 showing recommended products to automatically display new products related to the item the shopper was interested in.

In another exemplary embodiment, the HTML page embeds the dynamic HTML scripts, thereby including the product information and recommendation information. When the page renders on the frontend computing device of the shopper for the first time, the page displays initial products in a pre-determined order. Recommended products, in the first display may be associated with the pre-determined products. The dynamic scripts in the HTML page dynamically re-arranges the recommended products on the page when the shopper selects an item, without the need for the shopper's computing device to contact the service provider's backend computing device for additional scripts including the recommended product information. This can be implemented by creating a sortable list of recommended products, where the list may be sorted by the relationship information established by the recommended product information module 125 or instantaneously, based on the shopper's selection of a certain product from the product information list. In the case of the sortable list, the list is sortable at the shopper's computing device 135, while in the instantaneous implementation, the new list is retrieved in a sorted format from a backend computing device 145.

In another embodiment, when the retailer 105 logs into a registered account with the service provider's backend computing device 145, logging results of the shoppers' activities are displayed in a certain area of the service provider's website. The logging results may be sortable according to several parameters, including, time spent on retailer web pages, entry and exit web page links, purchasing information, etc.

General

The exemplary methods and systems described in this disclosure are illustrative, and, in alternative embodiments, certain steps can be performed in a different order, in parallel with one another, omitted entirely, and/or combined between different exemplary embodiments, and/or certain additional acts can be performed, without departing from the scope and spirit of this disclosure. Accordingly, such alternative embodiments are included in the inventions described herein.

For example, in certain exemplary embodiments, the service provider described herein can provide a product recommendation script to the retail website owner based on product information provided from the retailer or on external product information from other web-based resources. The product information from the retailer may include such information as, product detail, product specification, product deals, pricing, and internal web page hyperlinks, where each web page hyperlink provides product information for a product sold by the retailer. In certain exemplary embodiments, the external product information can be generated by web-crawling scripts that analyze millions of web pages online to understand new and existing products and the popularity of products. Popularity of products may be gauged from the number of web searches for the products, news articles on products, positive and negative word classification of news articles, and social network adoption of products. This allows the product recommendation service provider to generate external product and product web page information from external websites that relate to the products sold by the intended retail website. In another exemplary embodiment, when the retail website owner approves of using external website links, the product recommendation script may provide product recommendations to other retail websites owned by other external retailers. This process can be based on a business relationship between the retailers and the service providers for pay-per-click additional revenue stream shared by the retailers and the service providers.

In certain exemplary embodiments, following the submission of retailer information, the service provider website transfers the submitted information to the back-end computing device of the service provider for the generation of the recommendation and logging scripts, and an additional website design template (if required). The service provider backend computing device provides the retailer with the logging and recommendation scripts via the service provider website. These scripts can be 'cut and pasted' into existing web page software code of a retail website hosted by any website hosting company, thereby providing logging and recommendation capabilities to any existing retail website. The logging script can also transfer logging and shopper analytics information, in real-time, from the retail website to a service provider's backend computing device. This process enables the service provider to analyze information on shoppers and products on the service provider's backend computing devices. The exemplary embodiments disclosed herein also allows the retail website to receive additional or new product recommendation scripts, in real time, customized to each shopper on the retail website, as the shopper browses the retail website.

In certain exemplary embodiments, the product recommendation script may be added to the standard template web page design script from the website hosting company and then transferred to the shopper's computing device for rendering. In this process, the service provider's backend computing device receives the real-time logging information from the shopper's computing device using the logging script. The hosting server backend computing device or the service provider's backend computing device generates product recommendations in the form of product recommendation scripts that are responsive to the information analyzed from the logging script; the backend computing devices then send the recommendation scripts to the shopper's computing. The product recommendation script can request for new product recommendations from the service provider's backend computing device once the script has completed rendering on the shopper's computer.

Accordingly, new, real-time product recommendation scripts sent to the shopper's computer provide real-time updates to the recommended products based on the shopper's current trends. In this embodiment, it may be desirable to include a dynamic HTML or JavaScript coded product recommendation script (generated by the product recommendation service provider) that may be include function calls that may be capable of requesting replacement product recommendation scripts to be embedded, in real-time, into subsequent retail website pages as the web pages render on the shopper's computer. The logging script logs choices made by the shopper, and the information sent to the backend devices for analysis, the results of which updates the product recommendation script in real-time.

In certain exemplary embodiments, the product information submitted by the retailer may be in the form of a computer-coded product information script, instead of raw product information, such as product name, product description, etc. Computer-coded product information script may include an HTML web page with product information, including links to external product web pages outside the retailer's website, and internal product web page links. Further, the design of the retail website uses the template design scripts provided by the hosting company, rather than manually created using software codes. The product information software module on a backend computing device uses the product information submitted by the retailer to generate the product information script. Further, the product recommendation module of the same or a different backend computing device identifies submitted relationship information to establish relationships between retail products in the product information submitted by the retailer, or generates relationship information from external websites (for example, product logs, blogs, social networks, etc.). This product recommendation module uses this relationship information to generate the product recommendation script, where the recommendation script suggests products to the shopper based on the recommended product's relationship with the chosen products identified by a shopper.

In certain exemplary embodiments, one set of backend computing devices hosts the retail website, while a different set of backend computing devices performs the service provider's analysis and generating tasks. The website hosting company generates the optional web page design script and may include pre-defined locations in the design script for the optional product information scripts, the logging scripts, and the product recommendation scripts. This implementation may allow the shopper's computing device to receive a web page from the website host's backend computing device, where the web page can automatically re-arrange recommended products based on the shopper's choices. The product information script may include information on products that retailer sells on the website, where such information may further include specifications, price options, reviews, and shipping information. The recommendation script may also include the same product information as the product information script, but with ties to relationship information for each of the products on the retailer's website. When a shopper chooses a product using the product's web page link, a new web page with information on the chosen product opens, or a section of new page may be opened within the existing web page, the new page section includes the chosen product information. Additionally, the product recommendation script provides new recommended products based on the identified relationship from the relationship information associated with the chosen product from within the retailer's website or from external retail websites. This recommended product information in displayed in a recommendation section on the new product information web page.

In certain exemplary embodiments, conversion of the relationship between the shopper and products and/or the products themselves generates measurable values or parameters that, in certain exemplary embodiments, supplement the relationship information previously established by the retailer via the submitted product information. By way of an example, the relationship between the shopper and products may include a price versus deals relationship that may be defined when a certain shopper targets products in a certain price category, a popularity relationship, a review-based relationship, thereby defining a relationship category. Similarly, an inter-product relationship may include accessory type relationships, where, as an example, a camera may be accessorized with a tripod stand, memory cards, among other accessories, a brand based relationship, a price based relationship, and others. While the retailer may establish some relationships using the submitted relationship information, trends extracted from the logging information may establish other usable relationships. As an example, a relationship between a physical book and an electronic book reader type device establishes a process of recommending electronic books to shoppers of hard-copy books. Web-crawling software may identify this relationship, while the product recommendation module may analyze the crawled information for the exact relationship.

In other exemplary embodiments, product recommendation service provider may use a web-crawling script to index external web pages and other web-based information. Such information that pertains to the retail website may include, popular products based on searches, website logs, social network discussions, product reviews based on complaints, forums and news articles, and product-accessory relationships based on similarity, brand name and similar purchases made in the past. In one embodiment, the backend computing device of the product recommendation service provider receives logging information and a product search query from the retail website on a shopper's frontend computing. Analysis of the search query and the retailer's other products identifies a relationship between products listed in the product search query and actual products on the retail website. Such a relationship may be accessory-based, or historical, based on previous searches by the same shopper. Analysis of the product search query may also extend to external products from external websites and other web-based information collected by the service provider to review for relationship information. A backend database section for the service provider maintains a database of all search queries and logging information from within the retail website, as well as, external information from the web-crawling software.

In certain exemplary embodiments, a computing section in the backend database also computes or generates relationship information from the internal and external product and logging data. Such a relationship may be based on spatial autocorrelation pattern analysis of related data sets, where the relationship may be based on the degree of correlation in a multi-dimensional space including all the product information (internal or external), and the related search information. In one exemplary embodiment for measuring relationship levels in relationship information, where the measurement is a parametric value, the product recommendation module may implement a ranking or "points" scheme. For example, a product from the retail website may be associated with an accessory in at least 30% of all searches, and then a score of 3 can be tied to the product with respect to accessory-based relationship data. If product search results in two brands and one is searched by the brand name 45% more often than the other, then a score of 4.5 can be tied to the more popular brand name product with respect to popularity-based relationship data.

Users may be allowed to limit or otherwise affect the operation of the features disclosed in the specification. For example, users may be given opportunities to opt in or opt out of the collection or use of certain data or the activation of certain features. In addition, users may be given the opportunity to change the manner in which the features are employed, including for situations in which users may have concerns regarding their privacy. Instructions also may be provided to users to notify them regarding policies about the use of information, including personally identifiable information, and manners in which they may affect such use of information. Thus, personal information can be used to benefit a user, if desired, through receipt of more relevant advertisements or other information, without risking disclosure of personal information or the user's identity.

The exemplary embodiments can be used with computer hardware and software that perform the methods and processing functions described above. As will be appreciated by those having ordinary skill in that art, the systems, methods, and procedures described herein can be embodied in a programmable computer, computer executable software, or digital circuitry. The software can be stored on computer readable media. For example, "computer-coded," "software," "scripts," and "programs" are software codes used interchangeably for the purposes of simplicity in this disclosure. Further, "memory" and storage can include such media as, floppy disk, RAM, ROM, hard disk, removable media, flash memory, memory stick, optical media, magneto-optical media, CD-ROM, etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for providing hosted product recommendations on retail websites, comprising:
   collecting, by a computing device operated by a service provider, product information for two or more products available via the Internet, wherein the product information comprises one or more of a product name, product brand, product price, product picture, product rating, website address for a retailer, accessories related to a product, and products that are often bought by purchasers of the product;
   determining, by the computing device, that a first product is related to a second product based at least in part on the collected product information for the two or more products;
   generating, by the computing device, a product recommendation script, which comprises computer-coded information that is operable to cause information about the second product to be displayed on a retail website associated with the first product when the product recommendation script is embedded therein and when information about the first product is display on the retail website; and
   transmitting, by the computing device, the product recommendation script to a retail website host, which embeds the product recommendation script within the retail website such that execution of the script on the retail website when the first product is presented on the retail website causes the information about the second product to be presented on the retail website with the information for the first product, wherein the retail website host is distinct from the service provider.

2. The method of claim 1, wherein the retail website host is a retailer of the first product.

3. The method of claim 1, wherein the retail website host is a website hosting provider, which is operating on behalf of a retailer of the first product.

4. The method of claim 1, further comprising collecting, by the computing device, shopper information regarding at least one shopper of the retail website, wherein determining that the first product is related to the second product comprises identifying, by the computing device, the second products based at least in part on the he collected shopper information.

5. The method of claim 1, wherein the step of determining that the first product is related to the second product comprises extracting, by the computing device, relationship information from the collected product information for the two or more products.

6. The method of claim 1, wherein determining that the first product is related to the second product comprises analyzing, by the computing device, current trends on the retail website.

7. The method of claim 1, wherein determining that the first product is related to the second product comprises reviewing, by the computing device, information on at least one third party webpage that is not affiliated with the retail website.

8. The method of claim 6, wherein the third party webpage comprises at least one of a news article, a blog, a social networking web page, and an Internet discussion forum.

9. The method of claim 1, further comprising:
   generating, by the computing device, a logging script operable to collect shopper information in connection with the retail website; and
   transmitting, by the computing device, the logging script to the retail website host, which embeds the logging script within the retail website.

10. The method of claim 9, wherein determining that the first product is related to the second product comprises identifying, by the computing device, the second product based at least in part on the shopper information collected by the logging script.

11. A computer program product, comprising:
   a non-transitory computer-readable medium having computer-readable program instructions embodied therein that when executed by a computer cause the computer to provide hosted product recommendations on retail websites, the computer-readable program instructions comprising:
      computer-readable program instructions to collect product information for two or more products available via the Internet, wherein the product information comprises information relating to a product for sale or data indicating a relationship between the two or more products;
      computer-readable program instructions to determine that a first product is related to a second product based at least in part on the collected product information for the two or more products;
      computer-readable program instructions to generate a product recommendation script, which comprises computer-coded information that is operable to cause information about the second product to be displayed on a retail website associated with the first product when the product recommendation script is embedded therein and when information about the first product is display on the retail website; and
      computer-readable program instructions to transmit the product recommendation script to a retail website host, which embeds the product recommendation script within the retail website such that execution of the script on the retail website when the first product is presented on the retail website causes the information about the second product to be presented on the retail website with the information for the first product.

12. The computer program product of claim 11, wherein the product information further comprises one or more of a product name, product brand, product price, product picture, product rating, website address for a retailer, accessories related to a product, and products that are often bought by purchasers of the product.

13. The computer program product of claim 11, further comprising computer-readable program instructions to collect shopper information regarding at least one shopper of the retail website, wherein determining that the first product is related to the second product comprises computer-readable program instructions to identify the second products based at least in part on the he collected shopper information.

14. The computer program product of claim 11, wherein determining that the first product is related to the second product comprises computer-readable program instructions to analyze current trends on the retail website.

15. The computer program product of claim 11, wherein determining that the first product is related to the second product comprises computer-readable program instructions to review information on at least one third party webpage that is not affiliated with the retail website.

16. A system for providing hosted product recommendations on retail websites, comprising:

a storage medium; and a processor communicatively coupled to the storage medium, wherein the processor executes application code instructions that are stored in the storage medium and that cause the system to:

collect product information for two or more products available via the Internet, wherein the product information comprises information relating to a product for sale or data indicating a relationship between the two or more products;

determine that a first product is related to a second product based at least in part on the collected product information for the two or more products; and generate a product recommendation script, which comprises computer-coded information that is operable to cause information about the second product to be displayed on a retail website associated with the first product when the product recommendation script is embedded therein and when information about the first product is display on the retail website.

17. The system of claim 16, wherein the product information further comprises one or more of a product name, product brand, product price, product picture, product rating, website address for a retailer, accessories related to a product, and products that are often bought by purchasers of the product.

18. The system of claim 16, wherein the processor is further configured to execute computer-executable instructions stored in the storage medium to cause the system to transmit the product recommendation script to a retail website host, which embeds the product recommendation script within the retail website such that execution of the script on the retail website when the first product is presented on the retail website causes the information about the second product to be presented on the retail website with the information for the first product.

19. The system of claim 16, wherein the processor is further configured to execute computer-executable instructions stored in the storage medium to cause the system to collect shopper information regarding at least one shopper of the retail website, wherein determining that the first product is related to the second product comprises identifying the second products based at least in part on the he collected shopper information.

20. The system of claim 16, wherein determining that the first product is related to the second product comprises analyzing current trends on the retail website.

21. The system of claim 16, wherein determining that the first product is related to the second product comprises reviewing information on at least one third party webpage that is not affiliated with the retail website.

* * * * *